Figure 1:
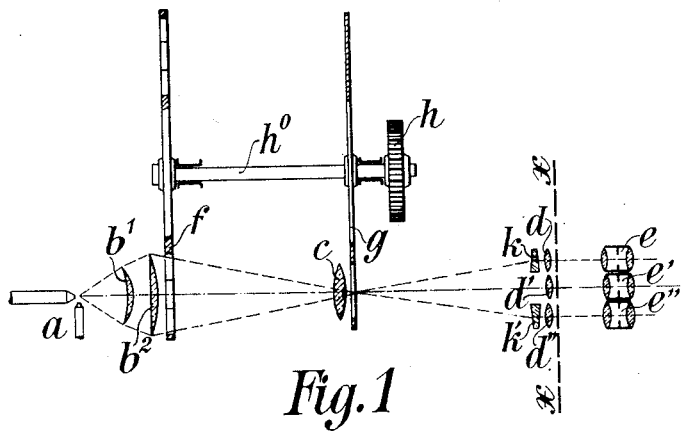

J. LEHMANN.
CINEMATOGRAPHIC APPARATUS.
APPLICATION FILED APR. 24, 1913.

1,214,798.

Patented Feb. 6, 1917.

Witnesses:
Paul Krüger
Fritz Sander

Inventor:
Johannes Lehmann

UNITED STATES PATENT OFFICE.

JOHANNES LEHMANN, OF JENA, GERMANY, ASSIGNOR TO THE FIRM OF CARL ZEISS, OF JENA, GERMANY.

CINEMATOGRAPHIC APPARATUS.

1,214,798.      Specification of Letters Patent.      Patented Feb. 6, 1917.

Application filed April 24, 1913. Serial No. 763,449.

*To all whom it may concern:*

Be it known that I, JOHANNES LEHMANN, a citizen of the German Empire, residing at Jena, Germany, have invented a new and useful Cinematographic Apparatus, of which the following is a specification.

The invention relates to apparatus for presenting cinematographic pictures by means of any number of simultaneously operative objectives, each of which is temporarily screened, *e. g.*, in the case of a filmband with intermittent motion, for the duration of the change from one picture to another. The screening is effected in the well-known apparatus as a rule by means of a rotatable screening disk, which is rotated corresponding to the motion of the filmband and is disposed either in the objectives or in their vicinity. According to the present invention the movable screen is not fitted in the said manner, but at a suitable place in the path of the rays of the lighting pencil between the source of light and the film-band and an image is formed of it by means of an optical system, which at the same time belongs to the lighting system of the apparatus, in the objectives. Apart from the constructive advantage, that it is then no longer obligatory to fit the screen in the vicinity of the objectives, in which position it is often inconvenient, it becomes possible through the new arrangement in the case where an image is formed in the objective, to cause the obscuring to take place simultaneously over the entire surface of the picture, without having to mount the screen, as is necessary in the constructions known up to the present, between the lenses of the objective. It will be found convenient, for bringing about a uniform obscuration of the entire surface of the picture, to dispose the screen at a place, where there is an image of the source of light. An additional advantage of the new disposition lies in the fact, that the screen in its effective positions keeps the light and thereby the heating effects of the same from the film.

When the apparatus has several objectives, which simultaneously receive ray-pencils from the same source of light, an arrangement frequently made use of, when colored cinematographic pictures are being presented, a further advantage results from the adoption of the invention. In such a case two or more pictures are simultaneously projected on a screen, so that the obscuration, *e. g.*, for the change from one picture to another, shall take place not only within each separate picture, but also conjointly for the said two or more pictures in a uniform manner. This can be brought about by the screen being fitted at a locus, in which an undivided image of the source of light is formed, so that the screen obscures simultaneously all the pictures lighted by the same source of light.

Figure 2:
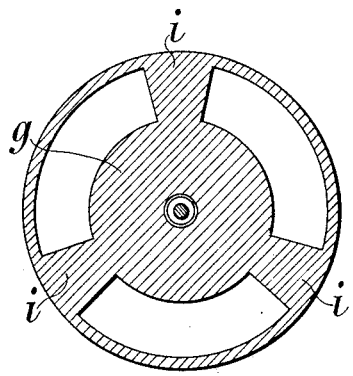

In the annexed drawing there is diagrammatically shown, as an example of how the invention may be realized, a cinematographic apparatus with three objectives for presenting colored pictures, Figure 1 showing a longitudinal section of the apparatus and Fig. 2 a front view of the screen-disk.

In this example $a$ denotes a source of light, $b^1$, $b^2$ a condenser system and $c$ a collective lens. The condenser system $b^1$, $b^2$ forms in close proximity to the lens $c$ and on that side of it, which is remote from the said condenser system, an image of the source of light $a$, of which at the same time an image is formed by auxiliary condenser lenses marked $d$, $d'$ and $d''$ respectively in the diaphragm-plane of each of the three projection-objectives marked respectively $e$, $e'$ and $e''$. In the vicinity of the condenser system $b^1$, $b^2$ is situated a rotatable color-filter disk $f$, the function of which is to provide each picture with its requisite color and of which an image is formed by means of the collective lens $c$ on the plane $x$ $x$ of the film-band, while adjacent to the collective lens $c$, at the locus of the image formed by $b^1$, $b^2$ of the source of light, the rotatable screen-disk $g$ is fitted, which is fixed along with the color-filter disk on a common arbor and is rotated, corresponding to the motion of the film-band, by means of a positive motion-transmission indicated in the drawing by the toothed wheel $h$. By means of the auxiliary condenser lenses $d$, $d'$ and $d''$ an image of this screen is formed simultaneously with the source of light in the diaphragm-plane of each of the three objectives, so that, when one of the opaque fields of the screen-disk, which are marked $i$, reaches a position in front of the lens $c$, the three objectives are simultaneously screened. The image of the source of light formed by the condenser system $b^1$, $b^2$ is practically not affected by the lens c, as this latter lens lies in close proximity of the plane of the said image; likewise the image of the color-filter disk f formed by the lens c is practically not affected by the lenses d and d'. In order that in spite of the distance apart of the axes of the three objectives the pictures belonging to each of the objectives may be lighted by ray-pencil systems having parallel axes, the refracting prisms k and k' are fitted in front of the auxiliary condenser lenses d and d''.

I claim:

1. In a cinematographic apparatus a source of light, a condenser near the source of light, a film adapted to travel through the path of the rays coming from the source of light, optical means adapted to form an image of the said film, a screen movably disposed between the source of light and the said optical means in the path of the said rays and other optical means adapted to form an image of the said screen in the locus of the first named optical means.

2. In a cinematographic apparatus a plurality of objectives, a source of light, a condenser near the source of light, a film adapted to travel through the path of the rays coming from the source of light, a screen movably disposed in the path of the said rays at a locus, in which there is an image of the source of light, formed by the said condenser, and optical means adapted to form an image of the said screen in the locus of the said objectives.

3. In a cinematographic apparatus a plurality of objectives, a source of light, a condenser near the source of light, a film adapted to travel through the path of the rays coming from the source of light, a screen movably disposed in the path of the said rays at a locus, in which there is an undivided image of the source of light, formed by the said condenser, and optical means adapted to form an image of the said screen in the locus of the said objectives.

JOHANNES LEHMANN.

Witnesses:
PAUL KRUGER,
FRITZ SANDER.